US012619921B2

(12) United States Patent
Chawla et al.

(10) Patent No.: US 12,619,921 B2
(45) Date of Patent: May 5, 2026

(54) PREDICTIVE FOG DATA CENTER MIGRATION

(71) Applicant: Kyndryl, Inc., New York, NY (US)

(72) Inventors: Girish M Chawla, Austin, TX (US); Shikhar Kwatra, San Jose, CA (US); Krishna Teja Rekapalli, Austin, TX (US); Isac Silva, Round Rock, TX (US); Russell C. Norberg, Austin, TX (US); Teresa M. Taylor, Austin, TX (US)

(73) Assignee: Kyndryl, Inc., New York, NY (US)

( * ) Notice: Subject to any disclaimer, the term of this patent is extended or adjusted under 35 U.S.C. 154(b) by 899 days.

(21) Appl. No.: 17/899,124

(22) Filed: Aug. 30, 2022

(65) Prior Publication Data

US 2024/0070550 A1    Feb. 29, 2024

(51) Int. Cl.
*G06N 20/20* (2019.01)

(52) U.S. Cl.
CPC .................................... *G06N 20/20* (2019.01)

(58) Field of Classification Search
CPC .......... G06N 20/20; G06N 7/01; G06N 20/00; G06N 20/10; G06N 5/01
See application file for complete search history.

(56) References Cited

U.S. PATENT DOCUMENTS

| | | |
|---|---|---|
| 8,261,033 B1 | 9/2012 | Slik et al. |
| 8,341,626 B1 | 12/2012 | Gardner et al. |
| 8,639,793 B2 | 1/2014 | Kapur et al. |

| | | |
|---|---|---|
| 2008/0033652 A1 | 2/2008 | Hensley et al. |
| 2009/0024713 A1 | 1/2009 | Strasenburgh et al. |
| 2012/0109705 A1 | 5/2012 | Belady et al. |
| 2012/0110186 A1 | 5/2012 | Kapur et al. |
| 2012/0310765 A1 | 12/2012 | Masters |
| 2015/0088586 A1 | 3/2015 | Pavlas et al. |
| 2015/0193246 A1 | 7/2015 | Luft |
| 2015/0195141 A1 | 7/2015 | Luft |
| 2015/0195347 A1 | 7/2015 | Luft |

(Continued)

FOREIGN PATENT DOCUMENTS

| | | |
|---|---|---|
| WO | 2013148040 | 10/2013 |

OTHER PUBLICATIONS

Lin, Qingwei, et al. "Predicting node failure in cloud service systems." Proceedings of the 2018 26th ACM joint meeting on European software engineering conference and symposium on the foundations of software engineering. 2018. (Year: 2018).*

(Continued)

*Primary Examiner* — Sehwan Kim
(74) *Attorney, Agent, or Firm* — Erik Swanson; Andrew D. Wright; Calderon Safran & Wright P.C.

(57) ABSTRACT

A computer-implemented method includes: obtaining, by a computing device, data items from data sources; classifying, by the computing device, the data items into categories using a first machine learning (ML) model; generating, by the computing device, a risk score of a first data center based on the classified data items and using a second machine learning (ML) model; determining, by the computing device, the risk score of the first data center exceeds a threshold; and in response to the determining the risk score of the first data center exceeds the threshold, initiating, by the computing device, a migration of the first data center to a second data center.

20 Claims, 6 Drawing Sheets

(56) References Cited

U.S. PATENT DOCUMENTS

| | | | | |
|---|---|---|---|---|
| 2018/0253661 | A1* | 9/2018 | Strauss | G06N 20/00 |
| 2019/0227843 | A1 | 7/2019 | Custodio et al. | |
| 2021/0021126 | A1* | 1/2021 | Hall | H02J 3/28 |
| 2021/0357834 | A1* | 11/2021 | Singh | G06Q 10/06314 |
| 2021/0358313 | A1* | 11/2021 | Ayhan | G08G 5/56 |
| 2021/0373973 | A1* | 12/2021 | Ekins | G06F 9/5088 |
| 2021/0398023 | A1 | 12/2021 | Lin et al. | |
| 2022/0159085 | A1* | 5/2022 | Gaetje | G01W 1/10 |
| 2022/0317912 | A1* | 10/2022 | Darji | G06F 3/067 |
| 2022/0357869 | A1* | 11/2022 | Salamon | G06F 11/3075 |

OTHER PUBLICATIONS

Tsangaratos, Paraskevas, and Ioanna Ilia. "Comparison of a logistic regression and Naïve Bayes classifier in landslide susceptibility assessments: The influence of models complexity and training dataset size." Catena 145 (2016): 164-179. (Year: 2016).*

Pooranian, Zahra, et al. "A novel distributed fog-based networked architecture to preserve energy in fog data centers." 2017 IEEE 14th International Conference on Mobile Ad Hoc and Sensor Systems (MASS). IEEE, 2017. (Year: 2017).*

Ayodele, T. R., et al. "Prediction of global solar irradiation using hybridized k-means and support vector regression algorithms." Renewable Energy Focus 29 (2019): 78-93. (Year: 2019).*

Al-Haija, Qasem Abu, Eyad Saleh, and Mohammad Alnabhan. "Detecting port scan attacks using logistic regression." 2021 4th International symposium on advanced electrical and communication technologies (ISAECT). IEEE, 2021. (Year: 2021).*

Naji, Hasan AH, et al. "Examining contributing factors on driving risk of naturalistic driving using K-means clustering and ordered logit regression." 2017 4th International Conference on Transportation Information and Safety (ICTIS). IEEE, 2017. (Year: 2017).*

Mell et al., "The NIST Definition of Cloud Computing", NIST, Special Publication 800-145, Sep. 2011, 7 pages.

Anonymous, "Method and System for Reducing Deployment of Risk Based Servers in a Production Environment", IPCOM000259977D, IP.com, Oct. 4, 2019, 5 pages.

Munir et al., "IFCIoT: Integrated Fog Cloud IoT Architectural Paradigm for Future Internet of Things", IEEE Consumer Electronics Magazine; vol. 6, No. 3, pp. 74-82, Jan. 30, 2017, 9 pages.

Filiposka et al., "Community-Based Allocation and Migration Strategies for Fog Computing", IEEE Wireless Communications and Networking Conference (WCNC), pp. 1-6, Jun. 11, 2018, 6 pages.

Acheson et al. "Extracting and modeling geographic information from scientific articles", https://doi.org/10.1371/journal.pone.0244918, Jan. 6, 2021, 19 pages.

Lu, "Classification of news articles using Naive Bayes classifier", https://larry-lu.github.io/data/Naive-Bayes-news-classification/, accessed May 10, 2022, 7 pages.

Bedangsen, "Text Classification of News Headlines using Naive Bayes Classification", https://github.com/bedangSen/Text-Classification-of-News-Headlines-using-Naives-Bayes-Classification, Mar. 8, 2019, 4 pages.

Kharwal, "News Classification with Machine Learning", https://thecleverprogrammer.com/2021/10/07/news-classification-with-machine-learning/, Oct. 7, 2021, 5 pages.

McCullum, "How to Build and Train Linear and Logistic Regression ML Models in Python", https://www.freecodecamp.org/news/how-to-build-and-train-linear-and-logistic-regression-ml-models-in-python/, Jun. 29, 2020, 49 pages.

Yousefpour et al., "All one needs to know about fog computing and related edge computing paradigms: A complete survey", https://doi.org/10.1016/j.sysarc.2019.02.009, Feb. 12, 2019, 42 pages.

Anonymous, "The Ultimate Guide to Logistic Regression for Machine Learning", https://www.keboola.com/blog/logistic-regression-machine-learning, Aug. 24, 2020, 18 pages.

Anonymous, "What is a data center migration?", https://www.vmware.com/topics/glossary/content/data-center-migration.html#:~:text=Datacenter, accessed May 11, 2022, 3 pages.

Anonymous, "What is Fog Computing? Definition and FAQs", https://www.heavy.ai/technical-glossary/fog-computing, accessed May 11, 2022, 6 pages.

* cited by examiner

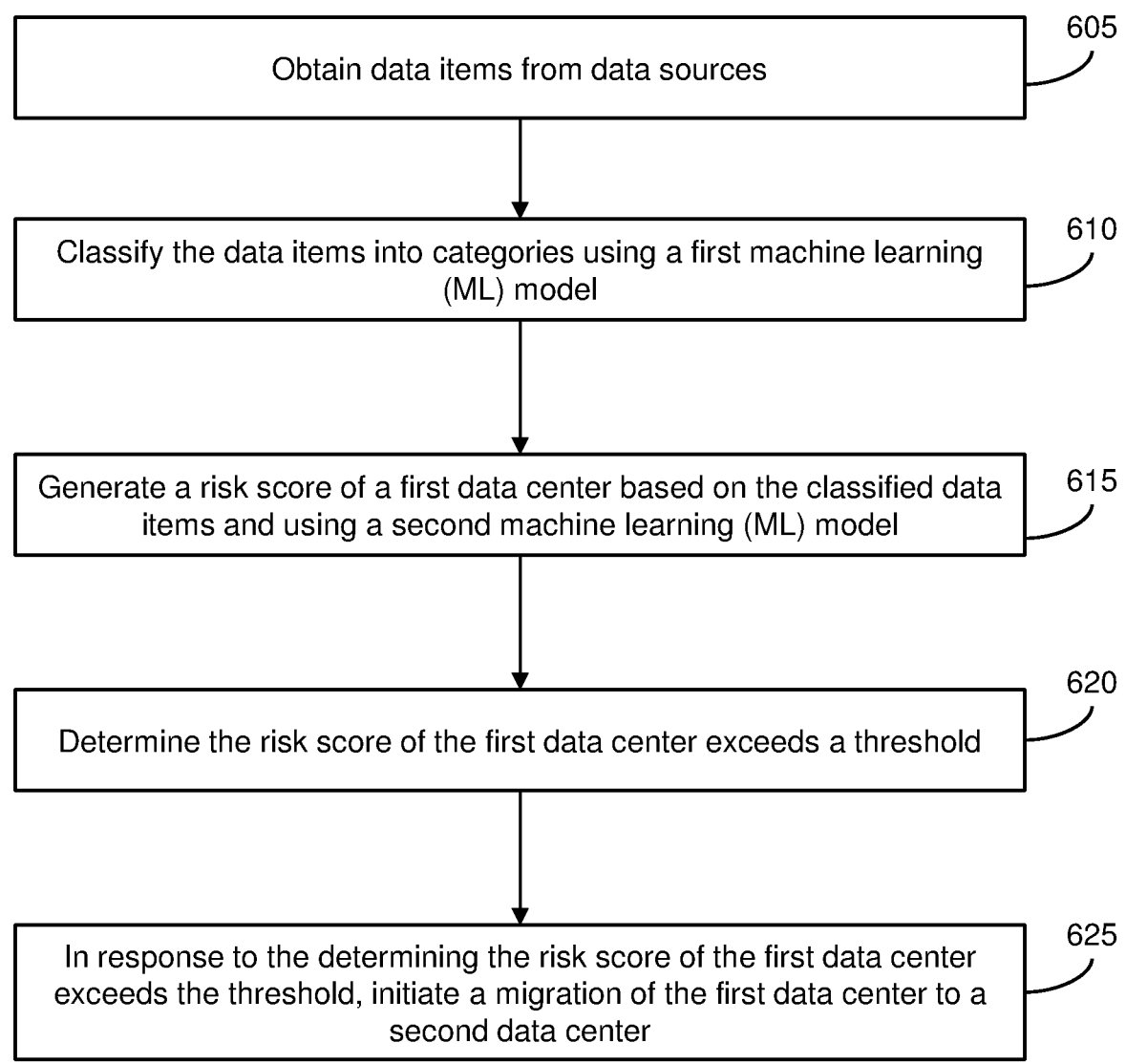

Obtain data items from data sources 605

Classify the data items into categories using a first machine learning (ML) model 610

Generate a risk score of a first data center based on the classified data items and using a second machine learning (ML) model 615

Determine the risk score of the first data center exceeds a threshold 620

In response to the determining the risk score of the first data center exceeds the threshold, initiate a migration of the first data center to a second data center 625

FIG. 6

PREDICTIVE FOG DATA CENTER MIGRATION

BACKGROUND

Aspects of the present invention relate generally to managing data centers and, more particularly, to predictive fog data center migration.

Fog computing, also called fog networking or fogging, describes a decentralized computing structure located between the cloud and devices that produce data. This flexible structure enables users to place resources, including applications and the data they produce, in logical locations to enhance performance. Fog computing bridges the gap between the cloud and Internet of Things (IoT) devices by enabling computing, storage, networking, and data management on the network nodes within the close vicinity of IoT devices. Therefore, computation, storage, networking, decision making, and data management occur along the path between IoT devices and the cloud, as data moves to the cloud from the IoT devices.

Data center migration refers to migrating a data center to a new computing environment. Data center migration may include application migration, which refers to migrating one or more applications from one computing environment to another. Data center migration may also include data migration, which refers to migrating specific sets of data from one storage system to another.

SUMMARY

In a first aspect of the invention, there is a computer-implemented method including: obtaining, by a computing device, data items from data sources; classifying, by the computing device, the data items into categories using a first machine learning (ML) model; generating, by the computing device, a risk score of a first data center based on the classified data items and using a second machine learning (ML) model; determining, by the computing device, the risk score of the first data center exceeds a threshold; and in response to the determining the risk score of the first data center exceeds the threshold, initiating, by the computing device, a migration of the first data center to a second data center.

In another aspect of the invention, there is a computer program product including one or more computer readable storage media having program instructions collectively stored on the one or more computer readable storage media. The program instructions are executable to: obtain data items from data sources; classify the data items into categories using a first machine learning (ML) model; generate a risk score of a first data center based on the classified data items and using a second machine learning (ML) model; determine the risk score of the first data center exceeds a threshold; and in response to the determining the risk score of the first data center exceeds the threshold, initiate a migration of the first data center to a second data center.

In another aspect of the invention, there is system including a processor, a computer readable memory, one or more computer readable storage media, and program instructions collectively stored on the one or more computer readable storage media. The program instructions are executable to: obtain data items from data sources; generate respective risk scores of respective data centers based on the data items and using an ensemble machine learning framework; and in response to determining the risk score of a first one of the data centers exceeds a threshold, initiate migration of the first one of the data centers to a second one of the data centers based on the risk score of the second one of the data centers being less than the threshold.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 6 shows a flowchart of an exemplary method in accordance with aspects of the invention.

DETAILED DESCRIPTION

Figure 1:
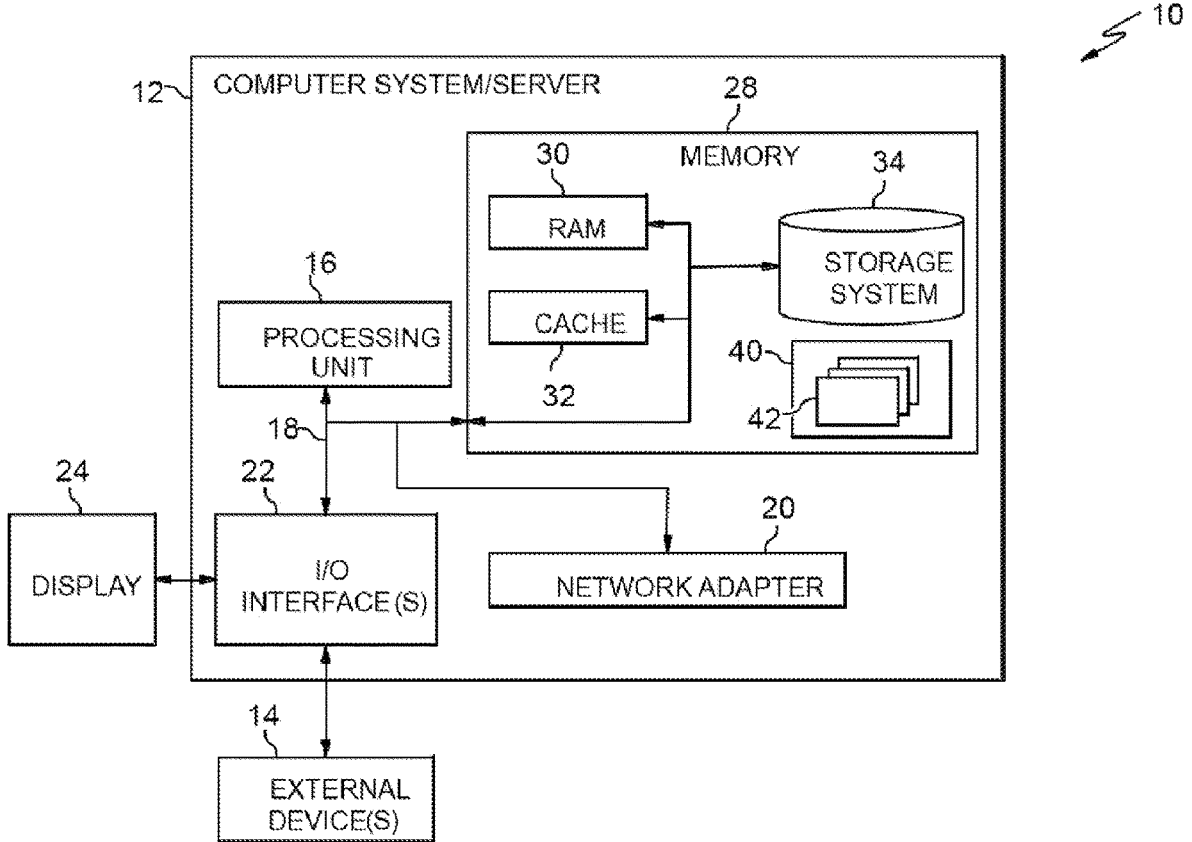
FIG. 1 depicts a cloud computing node according to an embodiment of the present invention.

Aspects of the present invention relate generally to managing data centers and, more particularly, to predictive fog data center migration. Numerous events can negatively affect fog data center productivity or make a fog location unavailable and therefore affect the workloads at that fog site. One example of such events includes errors and failures within the fog data center, such as user errors in the data center, and power supply, network, storage, and compute failures in the data center. Another example involves disasters within the vicinity of a fog data center, such as natural disasters (e.g., earthquakes, volcanos, hurricanes, flooding, fire, drought, etc.) and non-natural disasters (e.g., biohazards such as nuclear and/or chemical spills or accidents).

Currently there is no predictive and prescriptive methodology to assess risk and proactively move fog-based production environments across geographically dispersed fog data centers. Without this technology, a production environment that is impacted negatively by an event can experience data loss, severe business and financial impact, extensive downtime, and loss of functionality. Conventional systems for data center management only respond to such an event after it has occurred.

Implementations of the invention address this shortcoming by using data from published sources and evaluating the impact of an event so that a decision can be made to migrate to another data center. In embodiments, a system collects data on an ongoing basis and uses an ensemble machine learning framework to forecast a probability that an event such as these could negatively affect the data center based on ongoing streams. By using this predictive and prescriptive methodology, a decision can be made to proactively move cloud-based production environments from fog data center A to fog data center B. In embodiments, the decision to migrate a production environment is based on a risk assessment score which can be derived from configurable data sources. How the data sources in the production environment are weighted to produce the score may be configurable. Embodiments may include a method and system for continuously ingesting multi-source data streams and using an ensemble machine learning framework in order to migrate fog computing production environments proactively and prescriptively across geographically dispersed fog data centers. Predicting a risk score for a fog data center and proactively migrating the fog data center based on the risk score thus constitutes an improvement in the technical field of fog data center operation and management. The improvement is technical in nature because it involves using an ensemble machine learning framework to generate the risk score.

Implementations of the invention use a naïve bayes classifier with data streams to continuously classify events documented in information sources as either structured or unstructured data. After the information sources are classified, the system normalizes the data by calculating the percentage of the total number of information sources which fall into each classification. With this data, the system trains a logistic regression model to provide a probability of disruption of a fog data center using the percentage of information sources that were published in the previous 48-hour window. This probability is termed as a "risk score" or a "risk of disruption" score for the fog data center. In embodiments, this score is used when deciding to transfer workloads from a high-risk data center to a low-risk data center.

Embodiments utilize data from plural different data sources in generating a risk score for a fog data center. The data may include for example and without limitation: weather data (e.g., from weather websites); streaming news data (e.g., from news websites); monitoring data from the data center itself (e.g., from logs, monitoring software, etc.); other publicly available data (e.g., from government agencies, weather stations, power plants, hospitals, etc.); and historical data from previously recorded events.

Embodiments may utilize a machine learning process that includes a learning phase and a categorization phase. The learning phase may include normalization of historic data and feeding the data into a machine learning model. This may include receiving data from plural data sources, tagging the data, categorizing the data based on the tags, and feeding the structured data into the machine learning model (e.g., AI system). The categorization phase may include categorization using real-time event data. This may include feeding normalized, real-time event data into the trained the machine learning model, and the machine learning model processing and tagging the data based on previous learning and categorizing the data into one of plural predefined categories. Embodiments determine the risk score using the categorized data. Embodiments may display the risk score to a cloud broker system and recommend a data center to which the at-risk data center can be migrated.

According to an aspect of the invention, there is a computer implemented method of positioning a workload within an environment having an acceptable level of predicted risk, the method comprising: generating, by the computer, "Risk of Disruption" (RoD) scores for a first location and a second location; determining, by the computer, that the first location has an unacceptable level of risk; identifying, by the computer, that the second location has an acceptable level of risk; and migrating, by the computer, a production environment from the first location into the second location. The generating may include classifying (e.g., via regression analysis, etc.) the content of multi-source streams of data and assigning an associated value. The determining may include recognizing that the RoD score for the first location exceeds an acceptable risk threshold. The identifying may include recognizing that the RoD score for the second location is below an acceptable risk threshold. The classifying may include use of an artificial intelligence (AI)-based model trained to categorize the streams of data according to events and associated risk.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
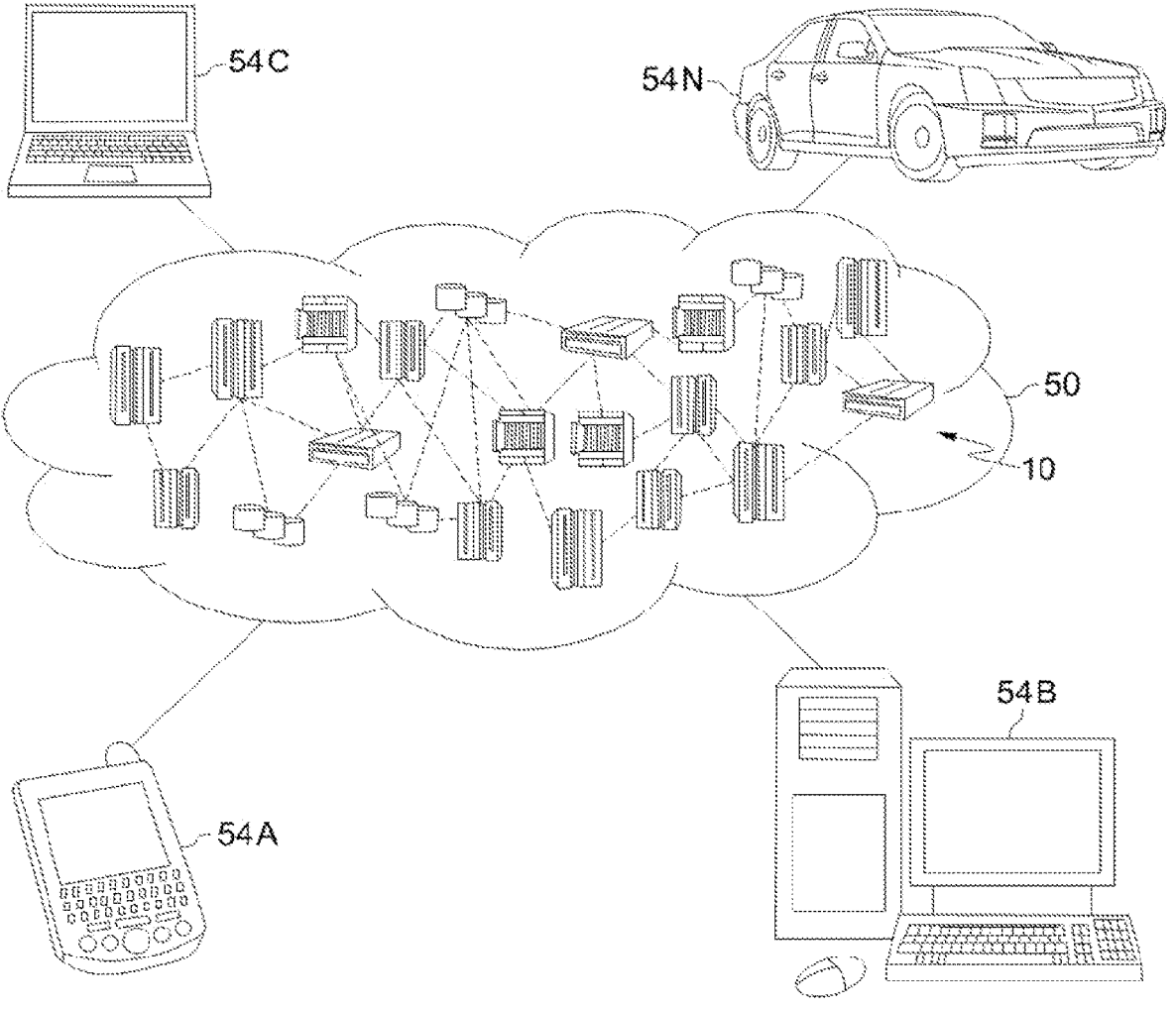
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
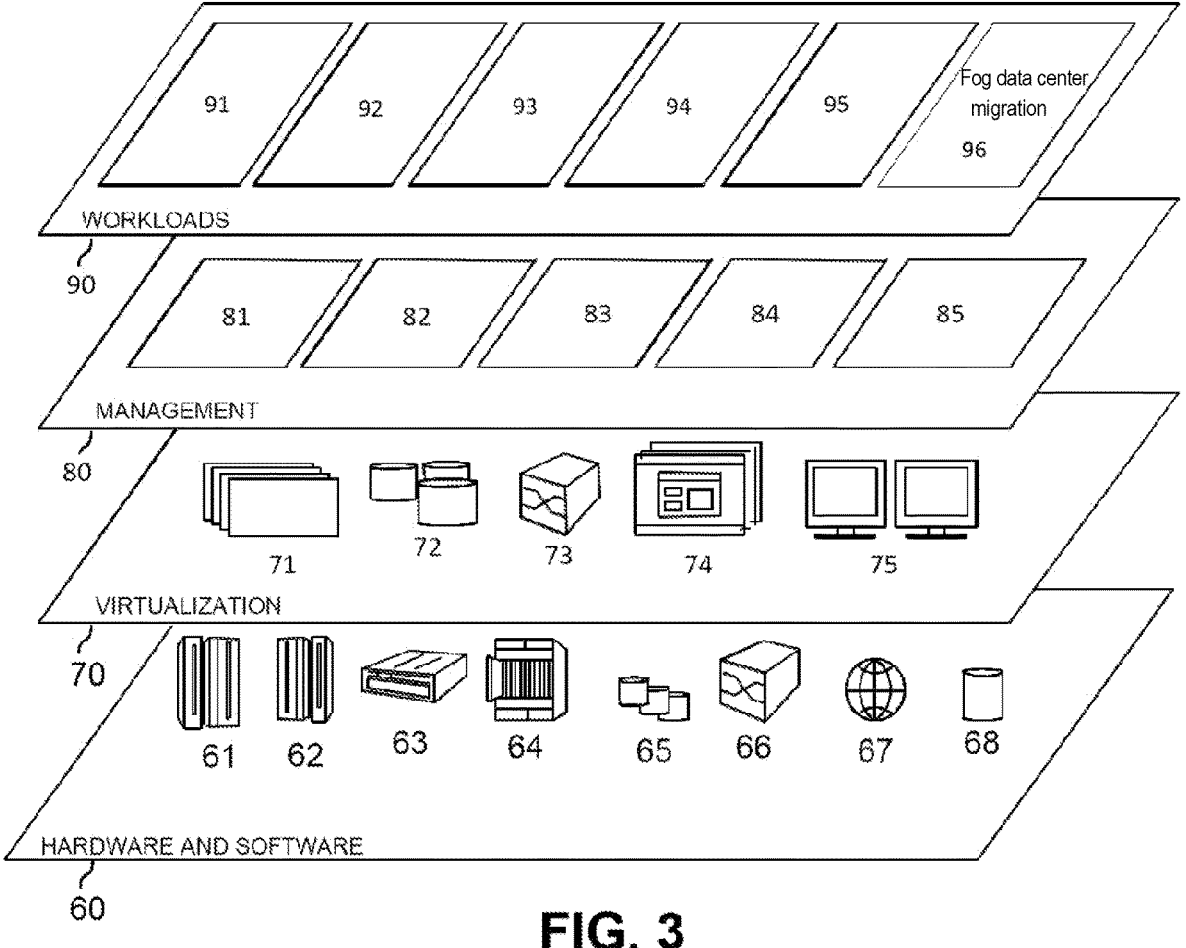
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and fog data center migration 96.

Implementations of the invention may include a computer system/server 12 of FIG. 1 in which one or more of the program modules 42 are configured to perform (or cause the computer system/server 12 to perform) one of more functions of the fog data center migration 96 of FIG. 3. For example, the one or more of the program modules 42 may be configured to: obtain data items from data sources; classify the data items into categories using a first machine learning (ML) model; generate a risk score of a first data center based on the classified data items and using a second machine learning (ML) model; determine the risk score of the first data center exceeds a threshold; and in response to the determining the risk score of the first data center exceeds the threshold, initiate a migration of the first data center to a second data center.

Figure 4:
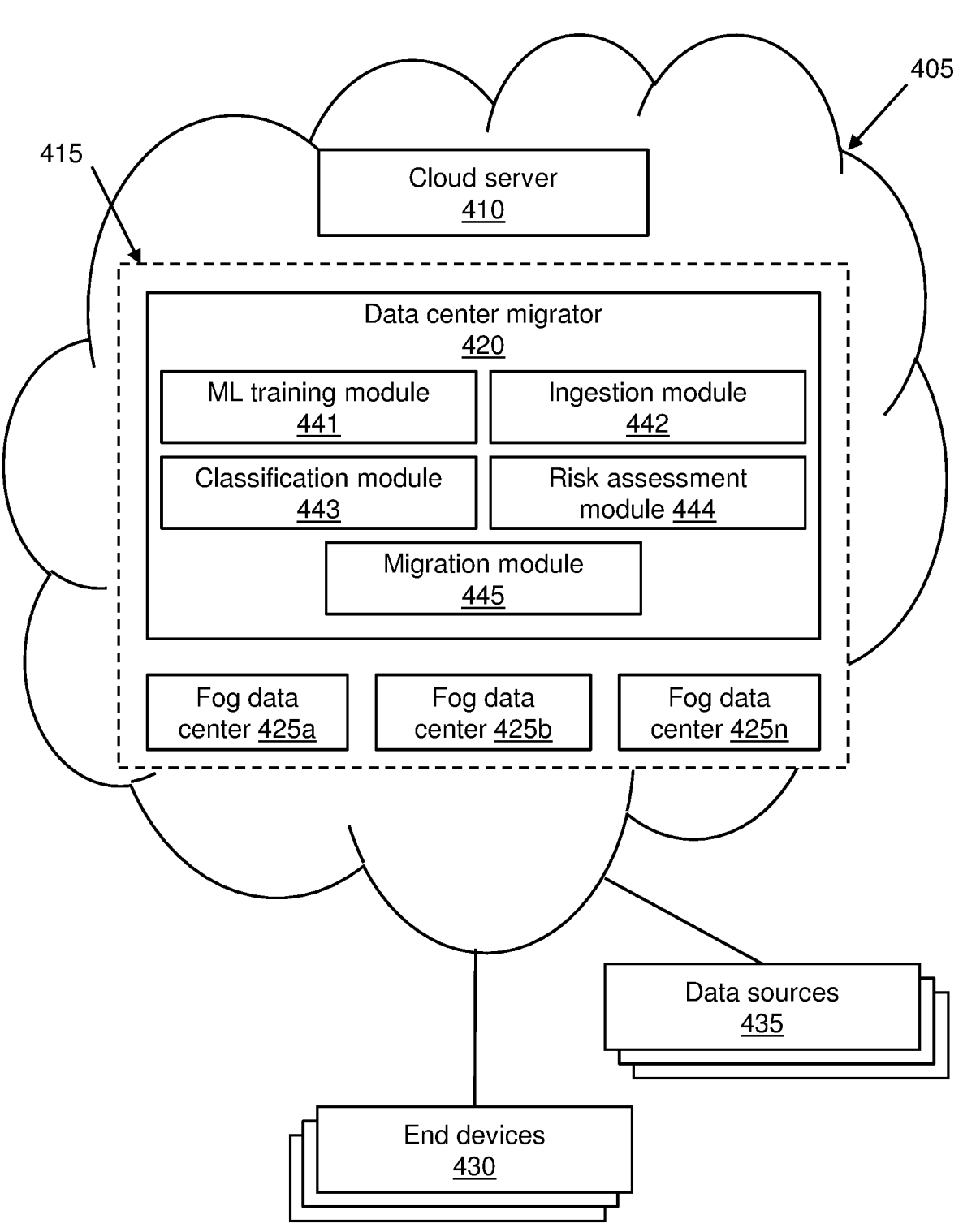
FIG. 4 shows a block diagram of an exemplary environment in accordance with aspects of the invention.

FIG. 4 shows a block diagram of an exemplary environment in accordance with aspects of the invention. In embodiments, the environment includes a distributed computing environment 405 that includes at least one cloud server 410 and a fog computing environment 415. In embodiments, the fog computing environment 415 includes data center migrator 420 and fog data centers 425a, 425b, . . . , 425n. In one example, each of the cloud server 410 and data center migrator 420 is a computing device comprising one or more elements of the computer system/server 12 of FIG. 1. In another example, each of the cloud server 410 and data center migrator 420 is implemented using a virtual machine (VM) or a container running on a physical server such as the computer system/server 12 of FIG. 1. There may be any number "n" of fog data centers, and each of the fog data centers 425a-n may comprise one or more storage systems (e.g., storage system 34 of FIG. 1), one or more servers (e.g., the computer system/server 12 of FIG. 1), and network infrastructure (e.g., switches and routers). The distributed computing environment 405 includes a network or combination of networks such as Private, Community, Public, or Hybrid clouds, and may include the Internet. Each of the cloud server 410, data center migrator 420, and fog data centers 425a-n may communicate with one another in the distributed computing environment 405, directly or indirectly, using network communications.

With continued reference to FIG. 4, end devices 430 communicate with one or more of the fog data centers 425a-n via network communication. In one example, the end devices 430 comprise Internet of Things (IoT) devices such as sensors, monitors, etc., that publish data to one of the fog data centers 425a-n. In another example, the end devices 430 comprise user computing devices such as a desktop computer, laptop computer, tablet computer, smartphone, self-driving cars, satellites, etc. In this example, an end device 430 may request a service via a website or software app, and data stored at one of the fog data centers 425a-n may be used to provide the requested service to the end device 430. In embodiments, the end devices 430 may comprise a combination of IoT devices and user computing devices.

In accordance with aspects of the invention, the fog data centers 425a-n are between the end devices 430 and the cloud server 410 in the network topology, such that the end devices 430 are closer to the fog data centers 425a-n than they are to the cloud server 410. In one embodiment, closer in this context means physical distance. In an example of this embodiment, an end device 430 is physically located in Key Largo, Florida, a first fog data center 425a is physically located in Miami, Florida, a second fog data center 425b is physically located in Orlando, Florida, and the cloud server 410 is physically located in Chicago, Illinois. Key Largo is physically closer to both Miami and Orlando than it is to Chicago, so the end device 430 is physically closer to the fog data centers than it is to the cloud server. Closer in aspects of the invention is not limited to physical distance and can be defined using other measures that affect network time to deliver content to the end device 430, such as number of network hops for example. Storing data at the fog data centers 425a-n (rather than at the cloud server 410) reduces the amount of time that data is being transmitted to or from the end devices 430, due to the physical distances between the respective devices as descried herein. As a result, the latency of these data operations is reduced for the end devices 430, which is often desired by the end user.

In embodiments, the data center migrator 420 comprises a machine learning (ML) training module 441, ingestion module 442, classification module 443, risk assessment module 444, and migration module 445, each of which may comprise one or more program modules such as program modules 42 described with respect to FIG. 1. The data center migrator 420 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

According to aspects of the invention, the ML training module 441 is configured to train a first ML model that is used by the classification module 443 to classify data items into one of plural predefined categories. In embodiments, the ML training module 441 trains the first ML model using supervised learning. For example, the ML training module 441 may train the first ML model using one or more training data sets that include plural historic data items that are each labeled with one of the plural predefined categories. In embodiments, the ML training module 441 trains the first ML model using machine learning algorithms and these labeled training data sets to recognize patterns in the data items that correspond to the labels. Training in this manner creates a first ML model that receives a data item as an input and that, based on the input, outputs one of the plural predefined categories. In this manner, the first ML model may be used to classify a data item into one of the plural predefined categories. In an example, the first ML model is a naïve bayes classifier.

In embodiments, the predefined categories are defined by a user when the first ML model is created and trained. Examples of categories include: earthquake; fire affecting power lines and networks; hurricane; wind; flooding; rain; hail; snow; tornado; lightning strike; power outage; volcano; landslide; human error; network outages (e.g., cables cut, denial of service, etc.); construction; heat; cold; changes in legality; defect in data center components; restrictions on what can be stored; restrictions on what can be output; location problems; provider requirements (e.g., refusal of services); and trade restrictions. These examples are for illustration and are not limiting.

According to aspects of the invention, the ML training module 441 is also configured to train a second ML model that is used by the risk assessment module 444 to generate a respective risk score for each of the fog data centers 425a-n based on the classification of plural data items. In embodiments, the risk score is a predicted probability that a particular fog data center is at risk of disruption. In embodiments, the ML training module 441 trains the second ML model using supervised learning. For example, the ML training module 441 may train the second ML model using training data sets, wherein each training data set includes a histogram or table of numbers of data items classified into each of the plural predefined categories, and a labeled binary result (e.g., disruption=true or false). In embodiments, the ML training module 441 trains the second ML model using machine learning algorithms and these training data sets to recognize patterns between numbers of data items classified into each of the plural predefined categories and the labeled binary result. Training in this manner creates a second ML model that receives a histogram or table of numbers of data items classified into each of the plural predefined categories as an input and that, based on the input, outputs a probability that corresponds to one of the binary results (e.g., disruption=true). In embodiments, the probability output by the second ML model is a number between 0 and 1 (or a number between 0 and 100) and constitutes a risk score that a particular fog data center is at risk of disruption. In this manner, the second ML model may be used to generate a risk score for a fog data center based on plural classified data items. In an example, the second ML model is a logistic regression model.

According to aspects of the invention, the ingestion module 442 is configured to ingest data items from plural different data sources 435, which may comprise one or more of news websites, weather websites, and social media websites. The data items may include but are not limited to articles from a news site, reports from a weather site, and posts from a social media site. In one example, the data items include weather data (e.g., from weather websites), streaming news data (e.g., from news websites), monitoring data from the data center itself (e.g., from logs, monitoring software, etc.), other publicly available data (e.g., from government agencies, weather stations, power plants, hospitals, etc.), and historical data from previously recorded events. The ingestion module 442 may subscribe to different websites to obtain the data items. Additionally, or alternatively, the ingestion module 442 may obtain the data items using web scraping of plural different websites. In embodiments, the ingestion module 442 is configured to determine a geographic location for each data item obtained from the data sources. This determination may be made, for example, using machine readable geographic metadata associated with a data item and/or by extracting geographic information using techniques such as natural language processing.

According to aspects of the invention, the ingestion module 442 is configured to filter the data items based on an age of the data items. In embodiments, the ingestion module 442 determines a date and time associated with each of the data items using, for example, machine readable date and time metadata associated with a data item and/or by extracting date and time information using techniques such as natural language processing. In embodiments, the ingestion module 442 compares the determined date and time of a data item to the current date and time and discards any data item that is older than the predefined amount, which may be a configurable value. In one example, the predefined amount is 48 hours, such that the ingestion module 442 discards data items that are more than 48 hours old.

According to aspects of the invention, the classification module 443 is configured to classify the data items from the data sources 435 into one of plural predefined categories. In embodiments, the classification module 443 classifies each data item into one of the plural predefined categories using the first ML model that is trained by the ML training module 441. In embodiments, the classification module 443 only classifies data items that are not discarded based on date and time, as described above.

According to aspects of the invention, the risk assessment module 444 is configured to determine a respective risk score for each of the fog data centers 425a-n. In embodiments, for a particular one of the fog data centers 425a-n, the risk assessment module 444 determines which of the data items correspond to this fog data center. In embodiments, the risk assessment module 444 determines which data items correspond to the one of the fog data centers 425a-n by comparing a geographic location associated with each data item to the geographic location of the one of the fog data centers 425a-n. In embodiments, the risk assessment module 444 stores or has access to data that defines a geographic location of each of the fog data centers 425a-n, for example a mailing address, zip code, or GPS coordinates. In embodiments, the risk assessment module 444 determines that a data item corresponds to one of the fog data centers when the determined geographic location of the data item (e.g., as determined by the ingestion module 442) is within a predefined distance from the fog data center. In embodiments, the predefined distance is a configurable parameter. In one example, the predefined distance is ten miles. In this manner, the risk assessment module 444 determines respective subsets of the data items that correspond to respective ones of the fog data centers 425a-n. Alternatively, the ingestion module 442 may determine the respective subsets of the data items that correspond to respective ones of the fog data centers 425a-n prior to classifying by the classification module 443.

In embodiments, for a particular one of the fog data centers 425a-n and for the subset of data items that corresponds to this one of the fog data centers, the risk assessment module 444 determines how many data items of this subset are in each of the plural predefined categories. In embodiments, the risk assessment module 444 establishes a count value for each of the plural predefined categories and increments the count value for a particular one of the plural predefined categories for each data item in the subset that is classified in this particular one of the plural predefined categories. For example, if there are 227 data items in the subset and there are four predefined categories, then the risk assessment module 444 determines how many of the 227 data items are classified in the first of the four predefined categories, how many of the 227 data items are classified in the second of the four predefined categories, how many of the 227 data items are classified in the third of the four predefined categories, and how many of the 227 data items are classified in the fourth of the four predefined categories. In embodiments, the risk assessment module 444 uses the classifications for the data items as determined by the classification module 443. In an embodiment, the risk assessment module 444 normalizes the numbers in the different predefined categories by determining a percentage. Continuing the example with 227 data items in the subset and four predefined categories, the risk assessment module 444 determines a percentage of the 227 data items that are classified in the first of the four predefined categories, a percentage of the 227 data items that are classified in the second of the four predefined categories, a percentage of the 227 data items that are classified in the third of the four predefined categories, and a percentage of the 227 data items that are classified in the fourth of the four predefined categories.

In embodiments, the risk assessment module 444 generates a risk score for this particular one of the fog data centers 425a-n using the second ML model and the determined numbers of data items of this subset in each of the plural predefined categories. In embodiments, the risk assessment module 444 provides the respective percentages of data items in each of the plural predefined categories as an input to the second ML model. Based on this input, the second ML model outputs a probability that is the risk score for this particular one of the fog data centers 425a-n.

In accordance with aspects of the invention, the data center migrator 420 generates respective risk scores for each respective one of the fog data centers 425a-n at substantially a same time. In this manner, the data center migrator 420 determines a snapshot of risk scores of all the fog data centers 425a-n for a given time. In embodiments, the data center migrator 420 repeats the determination on a regular basis, such as twice a day, for example. In embodiments, a risk score generated in this manner may also be referred to as a "Risk of Disruption" (RoD) score.

According to aspects of the invention, the migration module 445 is configured to initiate a migration of a particular one of the fog data centers 425a-n when the risk score for the one of the fog data centers 425a-n exceeds a predefined threshold value. In embodiments, the migration module 445 compares the risk score for the particular one of the fog data centers 425a-n (as determined by the risk assessment module 444) to the predefined threshold value. On the one hand, if the risk score is less than the predefined threshold value, then the migration module 445 does not migrate the fog data center, since such a risk score indicates that the fog data center is not at a level of risk that justifies migrating the fog data center. On the other hand, if the risk score is greater than the predefined threshold value, then the migration module 445 initiates migration of the fog data center, since such as risk score indicates that the fog data center is at a level of risk that justifies migrating the fog data center.

In one example, the migration module 445 initiates migration of the at-risk fog data center by automatically starting the migration process without human approval. In another example, the migration module 445 initiates migration of the at-risk fog data center by sending an alert to a user (e.g., a system administrator). The alert may indicate the at-risk fog data center and the risk score for the data center. The alert may include a selectable field (e.g., a button in a user interface) that the user may select (e.g., press the button) to approve migrating the at-risk fog data center. Upon receipt of such user input approving the migrating, the migration module 445 then initiates migration of the at-risk fog data. In both examples, conventional or later developed data center migration techniques may be used to migrate the at-risk fog data center to another one of the fog data centers 425a-n that is not at risk (e.g., has a risk score that is less than the predefined threshold value).

Table 1 shows an example of training data that can be used to train the second ML model in accordance with aspects of the invention. In this example, there are five predefined categories including category1, category2, category3, category4, and category5. Each row in Table 1 corresponds to a training data set including a percentage of data items in each of the five categories and a binary output (e.g., disruption=true or false). Although only three rows are shown, it is understood that training a machine learning model can involve hundreds or even thousands of such training data sets. In embodiments, the ML training module 441 uses data such as that shown in Table 1, along with machine learning training algorithms, to train a logistic regression model as the second ML model that is used by the risk assessment module to generate the risk score for a fog data center.

TABLE 1

| Category1 | Category2 | Category3 | Category4 | Category5 | Disruption |
|---|---|---|---|---|---|
| 55% | 30% | 5% | 5% | 5% | True |
| 90% | 1% | 5% | 1% | 3% | False |
| 12% | 3% | 5% | 20% | 60% | True |

Figure 5:
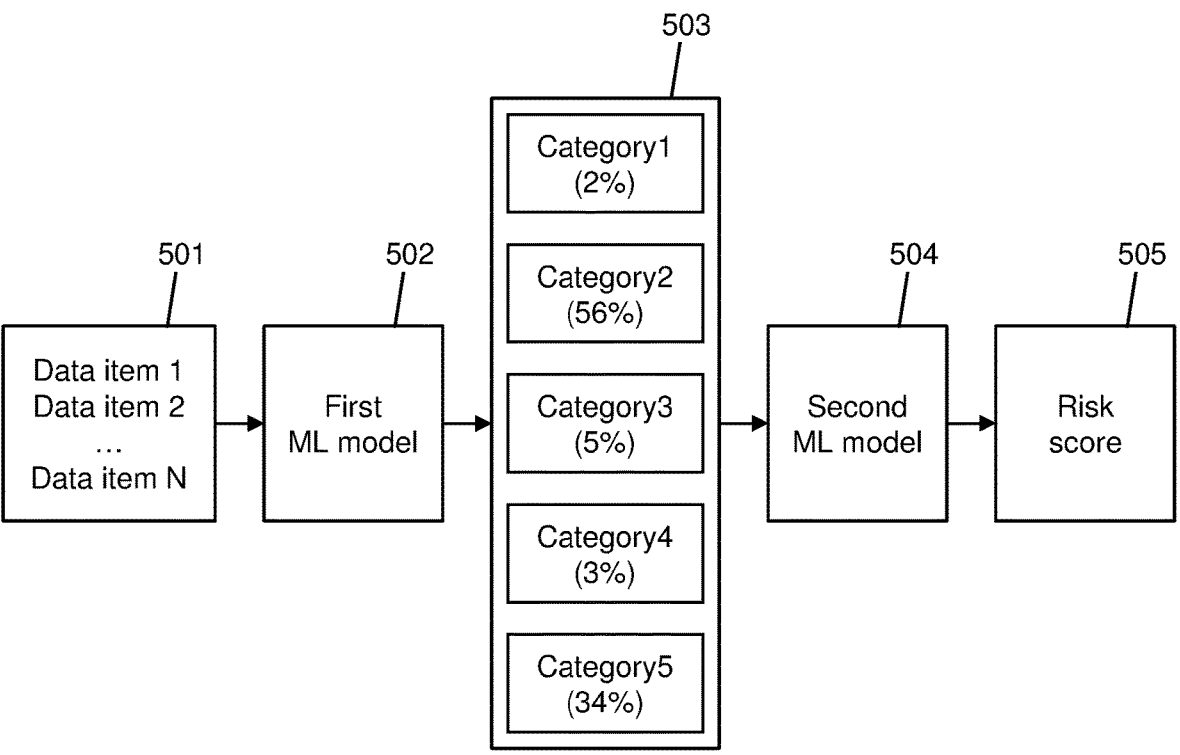
FIG. 5 shows a block diagram in accordance with aspects of the invention.

FIG. 5 shows a block diagram that illustrates aspects of the present invention. Steps of the block diagram may be carried out in the environment of FIG. 4 and are described with reference to elements depicted in FIG. 4. Block 501 represents "N" number of data items obtained by the ingestion module 442 from the data sources 435. Block 502 represents the classification module 443 using the first ML model to classify the data items from block 501. In this example, there are five predefined categories (category1, category2, category3, category4, category5) meaning that each of the N data items is classified into one of the five categories. Block 503 represents the normalized count of the N data items in each of the five categories. In this example, 2% of the N data items are classified in category1, 56% of the N data items are classified in category2, 5% of the N data items are classified in category3, 3% of the N data items are classified in category4, and 34% of the N data items are classified in category5. Block 504 represents the risk assessment module 444 using the second ML model to generate the risk score that is shown at block 505. In embodiments, the risk assessment module 444 inputs the normalized count values from block 503 into the second ML model and, based on these inputs, the second ML model outputs the risk score.

FIG. 6 shows a flowchart of an exemplary method in accordance with aspects of the present invention. Steps of the method may be carried out in the environment of FIG. 4 and are described with reference to elements depicted in FIG. 4.

At step 605, the system obtains data items from data sources. In embodiments, and as described with respect to FIG. 4, the ingestion module 442 obtains data items from the data sources 435.

At step 610, the system classifies the data items into categories using a first machine learning (ML) model. In embodiments, and as described with respect to FIG. 4, the classification module 443 classifies the data items into plural predefined categories.

At step 615, the system generates a risk score of a first data center based on the classified data items and using a second machine learning (ML) model. In embodiments, and as described with respect to FIG. 4, the risk assessment module 444 generates the risk score for a particular one of the fog data centers 425a-n using the second ML model.

At step 620, the system determines the risk score of the first data center exceeds a threshold. In embodiments, and as described with respect to FIG. 4, the risk assessment module compares the risk score of the fog data center to a predefined threshold value.

At step 625, in response to the determining the risk score of the first data center exceeds the threshold, the system initiates a migration of the first data center to a second data center. In embodiments, and as described with respect to FIG. 4, the migration module 445 initiates migration of the one of the one of the fog data centers 425a-n to another one of the one of the fog data centers 425a-n.

In embodiments, a service provider could offer to perform the processes described herein. In this case, the service provider can create, maintain, deploy, support, etc., the computer infrastructure that performs the process steps of the invention for one or more customers. These customers may be, for example, a business that maintains fog data centers and/or provides fog data center services to others. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

obtaining, by a computing device, data items from data sources;

configuring, by the computing device, a weightage of the data items based on a geographic location of the data sources;

classifying, by the computing device, the data items into categories using a first machine learning (ML) model;

generating, by the computing device, a risk score of a first fog data center based on the classified data items and using a second ML model, wherein normalized respective numbers of the classified data items are used as inputs to the second ML model;

determining, by the computing device, the risk score of the first fog data center exceeds a threshold;

in response to the determining the risk score of the first fog data center exceeds the threshold, sending to a user, by the computing device, an alert indicating the risk score of the first fog data center and having a selectable field for approving a migration of the first fog data center to a second fog data center; and in response to the user selecting the selectable field approving the migration, initiating, by the computing device, the migration of the first fog data center to the second fog data center before an event occurs, wherein the event comprises one of: failures within the first fog data center and disasters affecting the first fog data center.

2. The method of claim 1, further comprising determining respective numbers of the classified data items in respective ones of the categories.

3. The method of claim 2, further comprising normalizing the respective numbers of the classified data items.

4. The method of claim 1, wherein the first ML model comprises a naïve bayes classifier.

5. The method of claim 1, wherein the second ML model comprises a logistic regression model.

6. The method of claim 1, further comprising:

training a naïve bayes classifier using first training data to create the first ML model; and training a logistic regression model using second training data to create the second ML model, the second training data different from the first training data.

7. The method of claim 1, further comprising filtering the data items based on a predefined amount of time.

8. The method of claim 1, further comprising filtering the data items based on geographic location relative to the first fog data center.

9. The method of claim 1, further comprising determining the geographic location of the data sources by one of:

extracting machine readable geographic metadata associated with each data item of each data source; and extracting geographic information using natural language processing from each data item of each data source.

10. The method of claim 1, wherein the initiating the migration of the first fog data center to the second fog data center is based on a second risk score of the second fog data center being less than the threshold.

11. The method of claim 1, wherein the initiating the migration comprises automatically starting the migration.

12. The method of claim 1, wherein the data items comprise weather data and news data.

13. A computer program product comprising one or more computer readable storage media having program instructions collectively stored on the one or more computer readable storage media, the program instructions executable to:

obtain data items from data sources;

configure a weightage of the data items based on a geographic location of the data sources;

classify the data items into categories using a first machine learning (ML) model;

generate a risk score of a first fog data center based on the classified data items and using a second ML model, wherein normalized respective numbers of the classified data items are used as inputs to the second ML model;

determine the risk score of the first fog data center exceeds a threshold;

in response to the determining the risk score of the first fog data center exceeds the threshold, send to a user, an alert indicating the risk score of the first fog data center and having a selectable field for approving a migration of the first fog data center to a second fog data center; and in response to the user selecting the selectable field approving the migration, initiate the migration of the first fog data center to the second fog data center before an event occurs, wherein the event comprises one of: failures within the first fog data center and disasters affecting the first fog data center.

14. The computer program product of claim 13, wherein the program instructions are executable to:

determine respective numbers of the classified data items in respective ones of the categories; and normalize the respective numbers of the classified data items.

15. The computer program product of claim 13, wherein:

the first ML model comprises a naïve bayes classifier; and the second ML model comprises a logistic regression model.

16. The computer program product of claim 13, wherein the program instructions are executable to:

filter the data items based on a predefined amount of time; and filter the data items based on geographic location relative to the first fog data center.

17. A system comprising:

a processor, a computer readable memory, one or more computer readable storage media, and program instructions collectively stored on the one or more computer readable storage media, the program instructions executable to:

obtain data items from data sources;

configure a weightage of the data items based on a geographic location of the data sources;

classify the data items into categories using a first machine learning (ML) model;

generate a risk score of a first fog data center based on the classified data items and using a second ML model, wherein normalized respective numbers of the classified data items are used as inputs to the second ML model;

determine the risk score of the first fog data center exceeds a threshold;

in response to the determining the risk score of the first fog data center exceeds the threshold, send to a user, an alert indicating the risk score of the first fog data center and having a selectable field for approving a migration of the first fog data center to a second fog data center; and in response to the user selecting the selectable field approving the migration, initiate the migration of the first fog data center to the second fog data center before an event occurs, wherein the event comprises one of: failures within the first fog data center and disasters affecting the first fog data center.

18. The system of claim 17, wherein the first ML model comprising a naïve bayes classifier; and the second ML model comprising a logistic regression model.

19. The system of claim 17, wherein the program instructions are executable to:

filter the data items based on a predefined amount of time; and filter the data items based on geographic location relative to the first fog data center.

20. The system of claim 17, wherein the program instructions are executable to:

determine respective numbers of the classified data items in respective ones of the categories; and normalize the respective numbers of the classified data.

* * * * *